(12) United States Patent
Koyata et al.

(10) Patent No.: US 6,462,753 B1
(45) Date of Patent: *Oct. 8, 2002

(54) DUBBING SYSTEM, CONTROLLING APPARATUS THEREOF, AND DUBBING METHOD

(75) Inventors: Tomohiro Koyata, Tokyo; Shinji Isozaki; Hiroshi Mizuno, both of Nagano, all of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/145,902

(22) Filed: Sep. 2, 1998

(30) Foreign Application Priority Data

Sep. 19, 1997 (JP) .............................................. 9-255551

(51) Int. Cl.7 .............................. G09G 5/00; H04N 5/93; H04N 5/781
(52) U.S. Cl. ........................ 345/716; 345/718; 345/719; 386/52; 386/125
(58) Field of Search ................................ 345/302, 326, 345/327, 358, 700–702, 716, 719, 863, 328; 360/83, 84, 47, 48; 386/52, 95, 125, 55

(56) References Cited

U.S. PATENT DOCUMENTS

| | | | | | |
|---|---|---|---|---|---|
| 5,428,606 A | * | 6/1995 | Moskowitz | ................ | 370/400 |
| 5,627,764 A | * | 5/1997 | Schutzman et al. | ..... | 364/514 R |
| 5,669,568 A | * | 9/1997 | Kang et al. | ............... | 242/355.1 |
| 5,752,029 A | * | 5/1998 | Wissner | ...................... | 707/104 |
| 5,793,366 A | * | 8/1998 | Mano et al. | ................ | 345/329 |
| 5,835,662 A | * | 11/1998 | Inone | ......................... | 386/52 |
| 5,835,669 A | * | 11/1998 | Hirayama | .................... | 386/97 |
| 5,877,781 A | * | 3/1999 | Tomizawa | .................. | 345/326 |
| 5,880,788 A | * | 3/1999 | Bregler | ........................ | 348/515 |
| 5,889,514 A | * | 3/1999 | Boezeman | ................. | 345/328 |
| 5,920,306 A | * | 7/1999 | Kikinis | ........................ | 345/158 |
| 5,930,446 A | * | 7/1999 | Kanda | ......................... | 386/52 |
| 5,969,716 A | * | 10/1999 | Davis et al. | ................ | 345/328 |
| 6,002,395 A | * | 12/1999 | Wagner et al. | .............. | 345/763 |
| 6,118,444 A | * | 9/2000 | Garmon et al. | ............. | 345/328 |
| D436,580 S | * | 1/2001 | Nevano et al. | ............ | D14/114 |
| 6,204,842 B1 | * | 3/2001 | Fujii | ........................... | 345/717 |

FOREIGN PATENT DOCUMENTS

EP 0439281 A2 * 9/1996 ........... G11B/15/02

OTHER PUBLICATIONS

Microsoft Windows NT, Microsoft Corp. (Screen Shots), 1996.*

* cited by examiner

Primary Examiner—Kristine Kincaid
Assistant Examiner—Thomas J Joseph
(74) Attorney, Agent, or Firm—Oblon, Spivak, McClelland, Maier & Neustadt, P.C.

(57) ABSTRACT

A dubbing system has a reproducing apparatus, a recording apparatus, and a terminal apparatus connected with a bus line. Data reproduced by the reproducing apparatus is recorded to a recording medium of the recording apparatus. A first contents list of a recording medium of the reproducing apparatus and a second contents list of a recording medium of the recording apparatus are displayed as windows on a display unit. A program name of a program to be recorded to the recording apparatus is selected on the first contents list. The selected program name is moved to the second contents list by a cursor so as to select the program to be recorded, thereby causing corresponding data reproduced by the reproducing apparatus to be recorded on the recording medium of the recording apparatus.

17 Claims, 12 Drawing Sheets

Fig. 4

STORED DATA

| CATEGORY CODE | CD NO. | TRACK NO. | TITLE | ARTIST NAME | TIME PERIOD |
|---|---|---|---|---|---|
| CD2 | 1 | 000 | ABC | — | 53' 20" |
| CD2 | 1 | 001 | XYZ | — | 04' 57" |
| CD2 | 1 | 002 | LMN | — | 04' 16" |
| ⋮ | ⋮ | ⋮ | ⋮ | ⋮ | ⋮ |
| CD2 | 1 | 014 | JKL | — | 05' 04" |
| CD1 | 6 | 000 | — | — | 05' 05" |
| CD1 | 6 | 001 | — | — | 00' 50" |
| CD1 | 6 | 002 | — | — | 01' 19" |
| ⋮ | ⋮ | ⋮ | ⋮ | ⋮ | ⋮ |
| CD1 | 6 | 012 | — | — | 04' 07" |
| CD3 | 2 | 000 | NMO | — | 57' 05" |
| CD3 | 2 | 001 | FGH | cde | 2' 53" |
| CD3 | 2 | 002 | QRX | ghi | 4' 06" |
| ⋮ | ⋮ | ⋮ | ⋮ | ⋮ | ⋮ |
| CD3 | 2 | 016 | HIJ | opq | 3' 28" |

Fig. 8   SECTOR 0 (MANAGEMENT AREA)

|  | 16 bits || 16 bits ||
|---|---|---|---|---|
|  | MSB      LSB | MSB      LSB | MSB      LSB | MSB      LSB |
| 0 | 00000000 | 11111111 | 11111111 | 11111111 |
| 1 | 11111111 | 11111111 | 11111111 | 11111111 |
| 2 | 11111111 | 11111111 | 11111111 | 00000000 |
| 3 | cluster H | cluster L | 00000000 | 00000010 |
| 4 | 00000000 | 00000000 | 00000000 | 00000000 |
| 5 | 00000000 | 00000000 | 00000000 | 00000000 |
| 6 | 00000000 | 00000000 | 00000000 | 00000000 |
| 7 | Maker code | Model code | First TNO | Last TNO |
| 8 | 00000000 | 00000000 | 00000000 | Used Sectors |
| 9 | 00000000 | 00000000 | 00000000 | 00000000 |
| 10 | 00000000 | 00000000 | 00000000 | Disc Serial No. |
| 11 | Disc | ID | P-DFA | P-EMPTY |
| 12 | P-FRA | P-TNO1 | P-TNO2 | P-TNO3 |
| 13 | P-TNO4 | P-TNO5 | P-TNO6 | P-TNO7 |
| 74 | P-TNO248 | P-TNO249 | P-TNO250 | P-TNO251 |
| 75 | P-TNO252 | P-TNO253 | P-TNO254 | P-TNO255 |
| 76 | 00000000 | 00000000 | 00000000 | 00000000 |
| 77 | 00000000 | 00000000 | 00000000 | 00000000 |
| 78 | START ADDRESS ||| TRACK MODE |
| 79 | END ADDRESS ||| LINK INFO |
| 80 | START ADDRESS ||| TRACK MODE |
| 81 | END ADDRESS ||| LINK INFO |
| 82 | START ADDRESS ||| TRACK MODE |
| 83 | END ADDRESS ||| LINK INFO |
| 580 | START ADDRESS ||| TRACK MODE |
| 581 | END ADDRESS ||| LINK INFO |
| 582 | START ADDRESS ||| TRACK MODE |
| 583 | END ADDRESS ||| LINK INFO |
| 584 | START ADDRESS ||| TRACK MODE |
| 585 | END ADDRESS ||| LINK INFO |
| 586 | START ADDRESS ||| TRACK MODE |
| 587 | END ADDRESS ||| LINK INFO |

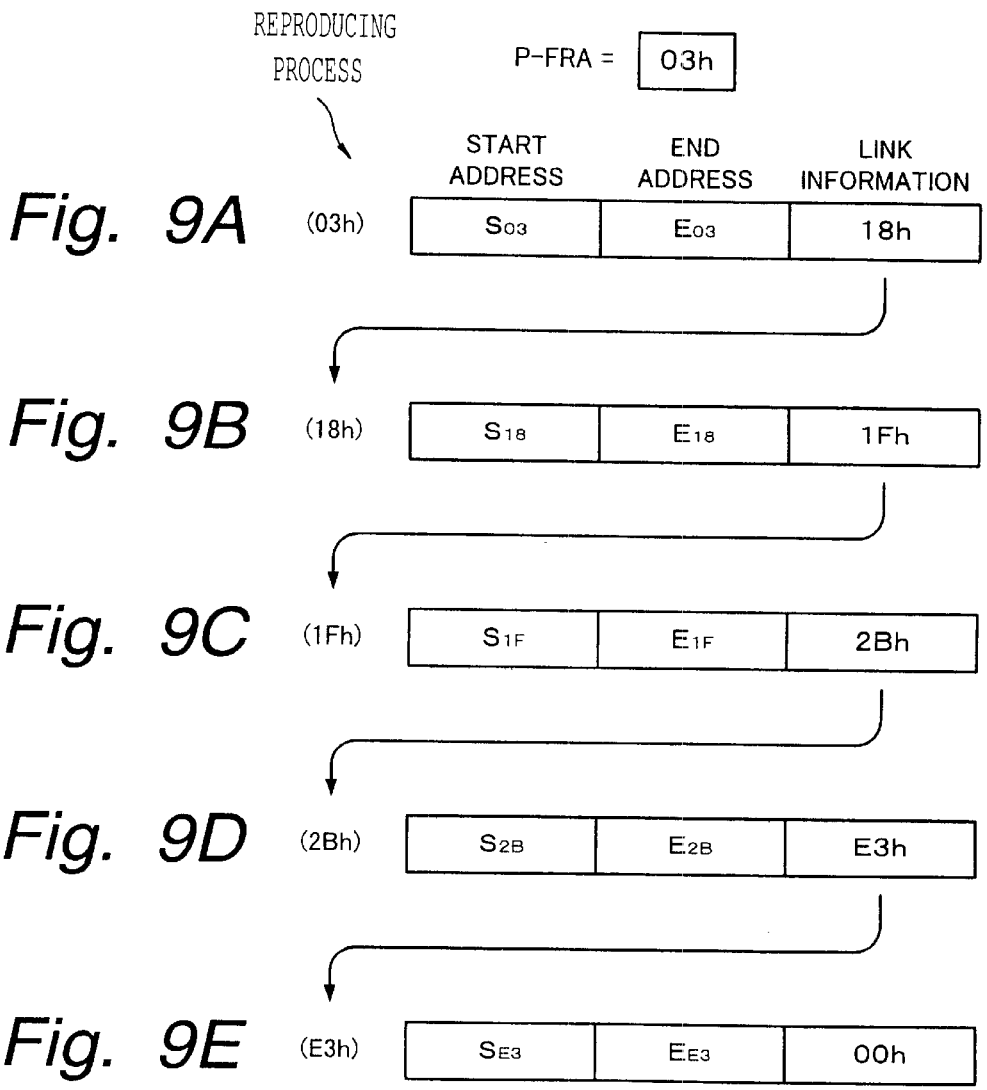

Fig. 10

SECTOR 1 (MANAGEMENT AREA)

| | 16 bits | | 16 bits | |
|---|---|---|---|---|
| | MSB    LSB | MSB    LSB | MSB    LSB | MSB    LSB |
| 0 | 00000000 | 11111111 | 11111111 | 11111111 |
| 1 | 11111111 | 11111111 | 11111111 | 11111111 |
| 2 | 11111111 | 11111111 | 11111111 | 00000000 |
| 3 | cluster H | cluster L | 00000001 | 00000010 |
| 4 | 00000000 | 00000000 | 00000000 | 00000000 |
| 5 | 00000000 | 00000000 | 00000000 | 00000000 |
| 6 | 00000000 | 00000000 | 00000000 | 00000000 |
| 7 | 00000000 | 00000000 | 00000000 | 00000000 |
| 8 | 00000000 | 00000000 | 00000000 | 00000000 |
| 9 | 00000000 | 00000000 | 00000000 | 00000000 |
| 10 | 00000000 | 00000000 | 00000000 | 00000000 |
| 11 | 00000000 | 00000000 | 00000000 | P-EMPTY |
| 12 | 00000000 | P-TNA1 | P-TNA2 | P-TNA3 |
| 13 | P-TNA4 | P-TNA5 | P-TNA6 | P-TNA7 |
| 74 | P-TNA248 | P-TNA249 | P-TNA250 | P-TNA251 |
| 75 | P-TNA252 | P-TNA253 | P-TNA254 | P-TNA255 |
| 76 | DISC NAME | | | |
| 77 | DISC NAME | | LINK INFO | |
| 78 | DISC NAME/TRACK NAME | | | |
| 79 | DISC NAME/TRACK NAME | | LINK INFO | |
| 80 | DISC NAME/TRACK NAME | | | |
| 81 | DISC NAME/TRACK NAME | | LINK INFO | |
| 82 | DISC NAME/TRACK NAME | | | |
| 83 | DISC NAME/TRACK NAME | | LINK INFO | |
| 584 | DISC NAME/TRACK NAME | | | |
| 585 | DISC NAME/TRACK NAME | | LINK INFO | |
| 586 | DISC NAME/TRACK NAME | | | |
| 587 | DISC NAME/TRACK NAME | | LINK INFO | |

Fig. 11

SECTOR 2 (RECORD DATE/TIME)

| | 16 bits | | 16 bits | |
|---|---|---|---|---|
| | MSB    LSB | MSB    LSB | MSB    LSB | MSB    LSB |
| 0 | 00000000 | 11111111 | 11111111 | 11111111 |
| 1 | 11111111 | 11111111 | 11111111 | 11111111 |
| 2 | 11111111 | 11111111 | 11111111 | 00000000 |
| 3 | cluster H | cluster L | 00000000 | 00000000 |
| 4 | 00000000 | 00000000 | 00000000 | 00000000 |
| 5 | 00000000 | 00000000 | 00000000 | 00000000 |
| 6 | 00000000 | 00000000 | 00000000 | 00000000 |
| 7 | 00000000 | 00000000 | 00000000 | 00000000 |
| 8 | 00000000 | 00000000 | 00000000 | 00000000 |
| 9 | 00000000 | 00000000 | 00000000 | 00000000 |
| 10 | 00000000 | 00000000 | 00000000 | 00000000 |
| 11 | 00000000 | 00000000 | 00000000 | P-EMPTY |
| 12 | 00000000 | P-TRD1 | P-TRD2 | P-TRD3 |
| 13 | P-TRD4 | P-TRD5 | P-TRD6 | P-TRD7 |
| 14 | P-TRD8 | P-TRD9 | P-TRD10 | P-TRD11 |
| 15 | P-TRD12 | P-TRD13 | P-TRD14 | P-TRD15 |
| 16 | P-TRD16 | | | |
| 17 | | | | |
| 73 | | | | |
| 74 | P-TRD248 | P-TRD249 | P-TRD250 | P-TRD251 |
| 75 | P-TRD252 | P-TRD253 | P-TRD254 | P-TRD255 |
| 76 | RECORD DATE/TIME | | | |
| 77 | | | MAKER CODE | MODEL CODE |
| 78 | RECORD DATE/TIME | | | |
| 79 | | | MAKER CODE | MODEL CODE |
| 80 | RECORD DATE/TIME | | | |
| 81 | | | MAKER CODE | MODEL CODE |
| 82 | RECORD DATE/TIME | | | |
| 83 | | | MAKER CODE | MODEL CODE |
| 84 | RECORD DATE/TIME | | | |
| 85 | | | | LINK INFO |
| 86 | | | | |
| 586 | RECORD DATE/TIME | | | |
| 587 | | | | LINK INFO |

Fig. 12

SECTOR 4 (PROGRAM TITLES)

| | 16 bits | | 16 bits | |
|---|---|---|---|---|
| | MSB    LSB | MSB    LSB | MSB    LSB | MSB    LSB |
| 0 | 00000000 | 11111111 | 11111111 | 11111111 |
| 1 | 11111111 | 11111111 | 11111111 | 11111111 |
| 2 | 11111111 | 11111111 | 11111111 | 00000000 |
| 3 | cluster H | cluster L | 00000000 | 00000000 |
| 4 | 00000000 | 00000000 | 00000000 | 00000000 |
| 5 | 00000000 | 00000000 | 00000000 | 00000000 |
| 6 | 00000000 | 00000000 | 00000000 | 00000000 |
| 7 | 00000000 | 00000000 | 00000000 | 00000000 |
| 8 | 00000000 | 00000000 | 00000000 | 00000000 |
| 9 | 00000000 | 00000000 | 00000000 | 00000000 |
| 10 | 00000000 | 00000000 | 00000000 | 00000000 |
| 11 | 00000000 | 00000000 | 00000000 | P-EMPTY |
| 12 | 00000000 | P-TNA1 | P-TNA2 | P-TNA3 |
| 13 | P-TNA4 | P-TNA5 | P-TNA6 | P-TNA7 |
| 14 | P-TNA8 | P-TNA9 | P-TNA10 | P-TNA11 |
| 15 | P-TNA12 | P-TNA13 | P-TNA14 | P-TNA15 |
| 16 | P-TNA16 | | | |
| 17 | | | | |
| 74 | P-TNA248 | P-TNA249 | P-TNA250 | P-TNA251 |
| 75 | P-TNA252 | P-TNA253 | P-TNA254 | P-TNA255 |
| 76 | DISC NAME | | | |
| 77 | DISC NAME | | | LINK INFO |
| 78 | DISC NAME OR TRACK NAME | | | |
| 79 | DISC NAME OR TRACK NAME | | | LINK INFO |
| 80 | DISC NAME OR TRACK NAME | | | |
| 81 | DISC NAME OR TRACK NAME | | | LINK INFO |
| 82 | DISC NAME OR TRACK NAME | | | |
| 83 | DISC NAME OR TRACK NAME | | | LINK INFO |
| 84 | DISC NAME OR TRACK NAME | | | |
| 85 | DISC NAME OR TRACK NAME | | | LINK INFO |
| 86 | | | | |
| 586 | DISC NAME OR TRACK NAME | | | |
| 587 | DISC NAME OR TRACK NAME | | | LINK INFO |

DUBBING SYSTEM, CONTROLLING APPARATUS THEREOF, AND DUBBING METHOD

BACKGROUND OF THE INVENTION

1. Field of the Invention

The present invention relates to a record/reproduction controlling apparatus that allows the user to easily select a program to be copied when a digital signal such as an audio signal and/or a video signal reproduced from a first record medium is recorded to a second record medium, a method thereof, a record controlling apparatus thereof, a method thereof, a reproduction controlling apparatus thereof, and a method thereof.

2. Description of the Related Art

Various types of reproducing apparatuses that reproduce digital audio signals from record mediums or recording/reproducing apparatuses that record/reproduce digital audio signals to/from record mediums are known. As apparatuses that record/reproduce digital audio signals, CD (Compact Disc) players, MD (Mini Disc) players, MD recorders (recording/reproducing apparatuses), DAT apparatuses (digital audio tape recorders) are known.

A dubbing operation for a digital audio signal or an analog audio signal is commonly performed between these apparatuses.

When the user performs the dubbing operation, he or she should designate a program to be recorded. When the user dubs a program reproduced from a CD to an MD, he or she should designate a part of or all of programs recorded on the CD so as to record the program(s) to the MD. When the user uses a CD changer, he or she selects a desired program from programs of a plurality of CDs so as to reproduce the selected program and record the reproduced program to an MD.

In the case of an MD changer, a plurality of recordable record mediums are loaded to the apparatus and programs are selectively recorded to the recordable record mediums.

To dub desired programs in a desired program order, the programs reproduced by the reproducing apparatus in the desired program order are recorded by the recording apparatus.

As another dubbing method, the user selects program names to be dubbed. The selected program names and the selected program order are stored to a memory. The reproducing apparatus reproduces the programs corresponding to the program names and program order stored in the memory. The recording apparatus records the programs in synchronization with the reproducing operation of the reproducing apparatus.

In the case of a changer of which a reproducing apparatus or a recording apparatus can load a plurality of record mediums and select one of the loaded record mediums, the user should designate a record medium on the reproducing apparatus side or a record medium on the recording apparatus side.

When the user dubs desired programs, with reference to liner notes and/or jackets of CDs thereof, he or she should designate the programs one by one using numeric keys or the like of the reproducing apparatus.

In the case of the CD changer, the user should designate not only program names, but his or her desired record mediums.

In the dubbing operation, sometimes, the user should designate a program order. The operation of which the user designates both programs and program order is referred to as a programmed reproducing operation. In the case of a record medium such as an MD of which the program order of recorded programs can be changed, the user designates the program numbers using the numeric keys or the like. Thereafter, the user changes the program order with the numeric keys or the like.

Thus, in the conventional program selecting operation, record medium selecting operation, and program order changing operation, the user should input information of a program name, a record medium, and a program order for each program. Consequently, the user should adversely spend a long time to perform the input operation.

Without reference to a liner note or a jacket of a CD, the user cannot know the contents (such as program names and program order). Thus, the user cannot know programs that can be selected or that have been selected.

With a medium whose program order can be changed, the user should input relevant program numbers with the numeric keys or the like. In addition, the user should input program numbers for changing the program order with the numeric keys or the like. Thus, the user cannot effectively perform the input operation.

OBJECTS AND SUMMARY OF THE INVENTION

An object of the present invention is to provide a record/reproduction controlling apparatus and a method thereof that allow the user to effectively perform a selecting operation for designating program names and program order so as to perform the dubbing operation or editing operation.

Another object of the present invention is to provide a record controlling apparatus and a method thereof that allows the user to effectively perform a program order changing operation.

A further object of the present invention is to provide a reproduction controlling apparatus and a method thereof that allows the user to effectively perform a program order selecting operation.

A first aspect of the present invention is a dubbing system, comprising a reproducing means for reproducing a program and management information from a first record medium on which a plurality of programs and management information are recorded, a recording means for recording a program reproduced from the reproducing means to a second record medium having a record area for recording a program and a management area for recording management information for managing the program recorded in the record area, a storing means for storing the management information reproduced by the reproducing means, a displaying means having a first display area and a second display area, the first display area displaying the management information that is read from the storing means, the second display area displaying the management information that is recorded in the management area of the second record medium, an operating means for controlling a cursor that designates a particular position of the displaying means, a controlling means for designating a program to be recorded from the first record medium to the second record medium when desired management information displayed in the first display area is designated and then the desired management information is moved to the second display area by the operating means, and a synchronous dubbing controlling means for controlling a synchronous dubbing operation of the recording means and the reproducing means so that a program corresponding to desired management information designated by the operating means in the management information displayed in the first display area is reproduced from the first record medium and that the reproduced program is recorded to the second record medium.

A second aspect of the present invention is a controlling apparatus, connected to a reproducing apparatus and a recording apparatus through a bus line, for controlling a synchronous dubbing operation of the reproducing apparatus and the recording apparatus, comprising a receiving means for receiving management information of a first record medium loaded to the reproducing apparatus and management information of a second record medium loaded to the recording apparatus, a display data generating means for generating first display data corresponding to first management information received by the receiving means and generating second display data corresponding to second management information, and a controlling means for controlling the synchronous dubbing operation of the recording apparatus and the reproducing apparatus so that corresponding to the movement of a cursor between a first display area corresponding to the first display data generated by the display data generating means and a second display area corresponding to the second display data, a program designated in the first display area is reproduced by the reproducing apparatus and the reproduced program is recorded by the recording apparatus.

A third aspect of the present invention is a controlling method for a dubbing operation performed by a reproducing apparatus for reproducing a program and management information from a first record medium on which a plurality of programs and first management information for managing the programs are recorded, a recording apparatus for recording a program reproduced from the reproducing apparatus to a second record medium having a record area for recording a program and a management area for recording second management information for managing the program recorded in the record area, and a controlling apparatus for controlling the reproducing apparatus and the recording apparatus, the reproducing apparatus, the recording apparatus, and the controlling apparatus being connected with a bus line, a program being sent from the reproducing apparatus to the recording apparatus so as to perform the dubbing operation, the controlling method comprising the steps of displaying a first contents list corresponding to the first management information received from the reproducing apparatus and a second contents list corresponding to the second management information received from the recording apparatus, designating a desired program on the first contents list with a cursor and moving the cursor to the second content list so as to decide a program to be recorded from the first record medium to the second record medium, and controlling a synchronous dubbing operation of the recording apparatus and the reproducing apparatus so that the desired program designated by the cursor on the first contents list is reproduced from the first record medium and that the reproduced program is recorded to the second record medium.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 4 is a schematic diagram showing an example of data stored in a personal computer according to the embodiment of the present invention;

FIG. 8 is a schematic diagram for explaining the data structure of sector 0 of a U-TOC area as a management area of a magnetic optical disc according to the present invention;

FIGS. 9A to 9E are schematic diagrams showing examples of a reproducing process using the U-TOC area as the management area of the magnetic optical disc according to the present invention;

FIG. 10 is a schematic diagram for explaining the data structure of sector 1 of the U-TOC area as the management area of the magnetic optical disc according to the present invention;

FIG. 11 is a schematic diagram for explaining the data structure of sector 2 of the U-TOC area as the management area of the magnetic optical disc according to the present invention; and FIG. 12 is a schematic diagram for explaining the data structure of sector 4 of the U-TOC area as the management area of the magnetic optical disc according to the present invention.

DETAILED DESCRIPTION OF THE PREFERRED EMBODIMENTS

Figure 1:
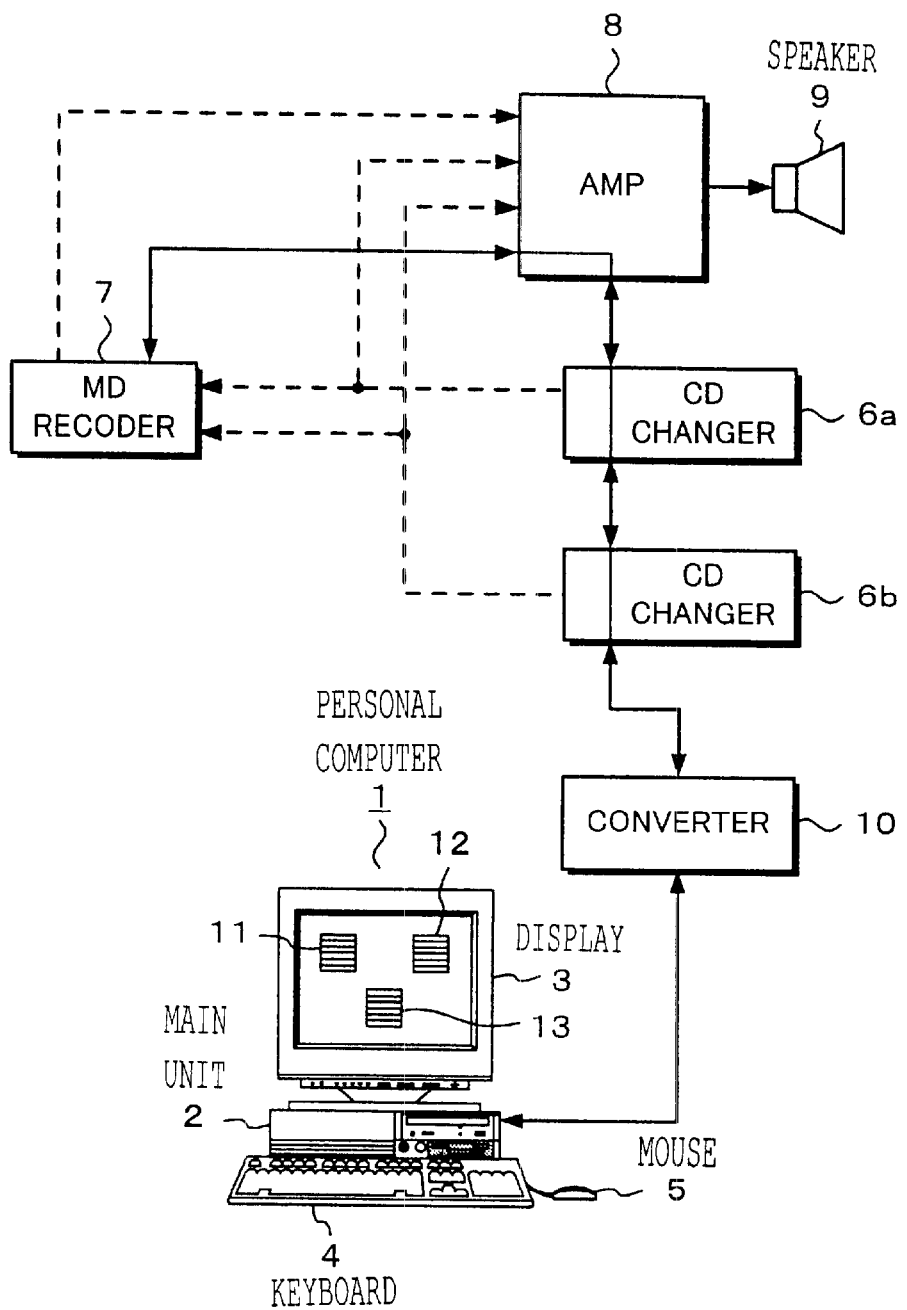
FIG. 1 is a block diagram showing the overall structure of a system according to an embodiment of the present invention.

Next, with reference to the accompanying drawings, an embodiment of the present invention will be described. FIG. 1 shows an example of the structure of an audio reproducing system having a personal computer 1 as a record/reproduction controlling apparatus according to the present invention. The personal computer 1 is a standard personal computer that comprises a main unit 2, a display unit 3, a keyboard 4, and a mouse 5. The main unit 2 has a CPU (Central Processing Unit), a RAM (Random Access Memory), a ROM (Read Only Memory), a hard disk, an interface, an input/output port, and so forth. When application software stored in for example a CD-ROM is installed to the hard disk of the main unit 2, the personal computer 1 functions as a record/reproduction controlling apparatus for the audio recording/reproducing system.

The personal computer 1 controls two CD changers 6a and 6b as the digital audio signal reproducing apparatus. An MD recorder 7 and an amplifier 8 are used as the digital audio signal recording apparatus. The personal computer 1, the CD changers 6a and 6b, and the MD recorder 7 are connected with a control signal bus line (represented by solid lines) in a chain shape. With a control signal sent through the control signal bus line, the operation of each unit is controlled. The control signal is sent from the personal computer 1. The operation of each unit can be controlled by the operating portion of each unit or a remote control system.

A matching converter 10 is disposed between the signal bus line of the personal computer 1 and the signal bus line of the audio system. The matching converter 10 receives different of formats of the control signals. The personal computer 1 and the converter 10 are connected with a signal bus line such as RS-232C (Recommended Standard—232C) or SCSI (Small Computer System Interface). The converter 10 and the audio apparatus side such as the CD changer 6b are connected with an audio apparatus controlling signal bus line.

In FIG. 1, the bus line of the audio signal (analog signal or digital signal) is represented by dotted lines. Reproduced audio signals of the CD changers 6a and 6b and the MD recorder 7 are input to the amplifier 8. An audio signal selected by the amplifier 8 is reproduced by a speaker 9.

FIG. 1 shows only an example of the system according to the present invention. For example, the present invention can be applied to a system having a plurality of AV apparatuses (not only audio apparatuses, but video apparatuses such as digital VCRs (Video Cassette Recorders)), an AV (Audio, Video) controller connected thereto in a star shape, and a personal computer connected thereto. When the personal computer 1 and an audio apparatus such as the CD changer 6a are connected with IEEE 1394 interface, it is not necessary to separate the bus line of the digital information signal and the bus line of the control signal.

The control signal bus line is of bidirectional type. In addition to operation control data and clock signal, identification information corresponding to a program name and a CD (record medium) is sent on the control signal bus line.

Identification information corresponding to a CD is for example a disc name thereof. A typical example of identification information corresponding to a program is character information that represents a program name. For example, character information such as a disc name, a program name, a performer name, and so forth is recorded in a lead-in area of a CD. This system is referred to as CD text system. Character information of a disc name and a program name is used as identification information.

In addition, the user can input characters (alphanumeric characters, Katakana characters, and so forth) for a disc name, a program name, and so forth of a CD. The character information is stored in a non-volatile memory. This function is referred to as custom file function. In this case, the character information is used as identification information.

Character information such as a program name is displayed on the display unit 3 of the personal computer 1 so as to identify each program. However, non-character information may be used as long as the user can identify a CD and a program and the apparatus can be controlled corresponding to the information so as to reproduce a selected program from a selected CD.

In the case of a CD, TOC data is recorded in a management lead-in area thereof. The TOC data includes the start address (absolute time) of each program (represented by a track number) of the CD. Thus, the performance time period of each program is obtained with the TOC information. The performance time period of each program can be used as identification information. In addition, the total performance time period of the CD can be obtained with the TOC information. The total performance time period can be used as the identification information of the CD. This is because the probability of which the performance time period of one program matches the performance time period of another program is low. In addition, the probability of which the total performance time period of one CD matches the total performance time period of another CD is low.

In the above-described custom file, the total performance time period and user input character information are correlatively stored in the memory. When the CD is loaded, with reference to the total performance time period obtained from the TOC information and the total performance time period of each program stored in the memory, when they match, the disc name designated by the user is read from the memory and displayed. When the storage capacity of the memory is large, the user can input the program name of each program along with the disc name. In this case, each program and the program name thereof can be correlated with the performance time period of each program.

In the embodiment of the present invention, as will be described later, a first window 11, a second window 12, and a third window 13 are displayed on the display unit 3 of the personal computer 1. Identification information such as a disc name and a program name is displayed on the windows. When the user performs the drag and drop operation of the mouse 5, he or she can select a CD and a program to be recorded to the MD recorder.

When the user clicks an icon and/or a button with the mouse 5, he or she can control the operations of the CD changers 6a and 6b, the MD recorder 7, and the amplifier 8. When the user clicks an icon and/or a button on the screen, he or she can edit each program (for example, combine two programs).

The graphical view and operating method for the display unit 3 such as a window function, a CD/program selecting function with the mouse 5, and operation controlling function with icons and the mouse 5 are provided by GUI (Graphic User Interface) software. In this example, the mouse 5 is used. However, as another pointing device operated by the user, a trackball, a cursor key, a rotating knob (such as a jog dial), or the like can be used.

Figure 2:
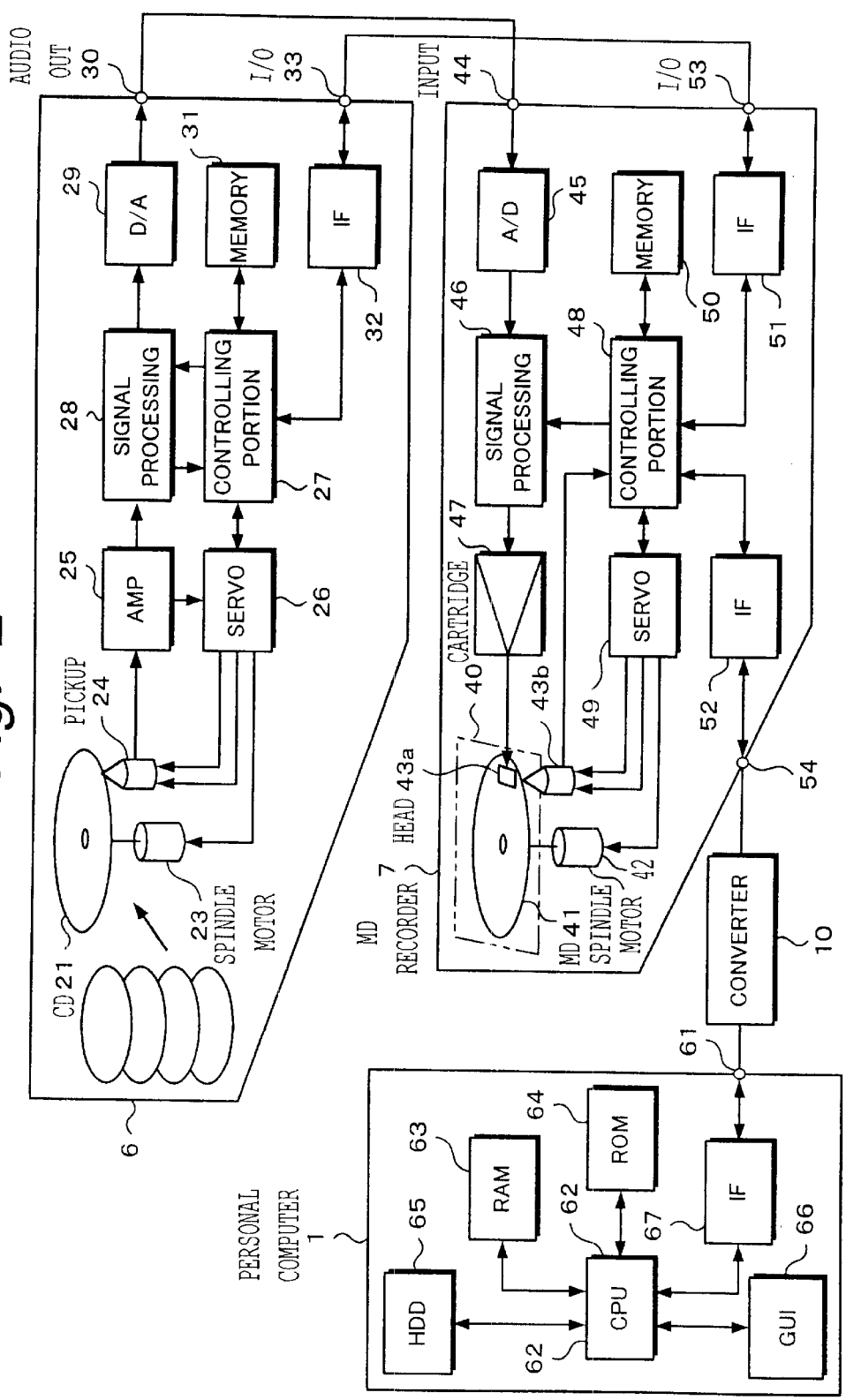
FIG. 2 is a block diagram showing the detailed structure of each block of the system according to the embodiment of the present invention.

FIG. 2 shows the structure of each block of the system in detail. In FIG. 2, for simplicity, one CD changer 6 is used. An MD recorder 7 is connected to a personal computer 1. Next, the operation of the CD changer 6 will be described. One of five CDs is selected and loaded to a CD rotating portion. The CD 21 is rotated by a spindle motor 23. A plurality of programs are recorded as a pit pattern on the CD 21. A TOC (Table Of Content) is recorded in a lead-in area at the innermost peripheral position of the CD 21. A pickup 24 optically reads information recorded on the CD 21. When the CD 21 is loaded to the CD rotating portion, before a program is reproduced from the CD 21, the pickup 24 reads the TOC. When the CD 21 is a CD text format disc, the pickup 24 reads CD text information as the TOC.

A signal that is read by the pickup 24 is supplied to an RF amplifier 25. The RF amplifier 25 has a function of an RF signal processing circuit. In other words, the RF amplifier 25 digitizes an RF signal and generates a tracking error signal and a focus error signal. These error signals are supplied to a servo circuit 26. The servo circuit 26 performs a focus controlling process and a tracking controlling process. In addition, the servo circuit 26 rotates and drives the spindle motor 23 at CLV (Constant Linear Velocity). With output signals of the servo circuit 26, a focus actuator and a tracking actuator of the pickup 24 are driven. A unit (not shown) that moves the pickup 24 in the disc radius direction is controlled by the servo circuit 26. The servo circuit 26 and a controlling portion 27 are connected. With a control signal that is output from the controlling portion 27, a desired program of the CD 21 can be accessed.

The digitized reproduced signal is supplied from the RF amplifier 25 to a signal processing circuit 28. The signal processing circuit 28 has a PLL (Phase Locked Loop) circuit, an EFM (Eight Fourteen Modulation) demodulating circuit, an error correcting circuit, and so forth. A digital audio signal that is output from the signal processing circuit 28 is supplied to a D/A converter 29. The D/A converter 29 converts the digital audio signal into an analog audio signal. The analog audio signal is obtained from an audio output terminal 30. The signal processing circuit 28 performs a memory controlling process under the control of the controlling portion 27. The signal processing circuit 28 supplies a subcode to the controlling portion 27.

The controlling portion 27 has a subcode processing portion. The subcode processing portion performs a subcode error detecting process, a subcode channel separating process (for P, Q, and R to W channels), a channel decoding process, and so forth. The P channel of the subcode has information that represents whether a program is present. The Q channel has information of the absolute time information of the current CD, the time information of each program, the program number (track number), the movement number (index), and so forth. Thus, with the information of the Q channel, a reproducing operation such as a program selecting operation can be controlled. With the information of the Q channel, the user can visually know the program number of the currently reproduced program, the elapsed time of the program, the absolute time from the beginning, and so forth.

In addition, with the R to W channels of the subcode of the lead-in area, additional character information is recorded to the CD. This system is referred to as CD text.

In the case of the CD text, character information of around 6500 characters can be recorded. In addition, the additional character information of the CD is limited to up to 800 characters so that the character information can be handled in languages of eight countries. When the R to W channels of the subcode are decoded by a CD text decoder, CD text data can be obtained. The TOC information and the CD text data are stored in a TOC memory and a CD text memory of a memory portion 31 connected to the controlling portion 27, respectively.

In this case, all the CD text data may be stored. Alternatively, to decrease the storage capacity of the memory portion 31, only CD text data (namely, a disc name, a program name, and an artist name) for identifying a disc and a program may be stored.

The type of the CD text can be identified with ID1 of the CD text format (mode 4). In other words, ID1 represents a character string. For example, (80h) of ID1 represents a disc name/a program name. (81h) of ID1 represents a performer name/a conductor name/an orchestra name (these names are representatively referred to as artist name). (82h) of ID1 represents a song writer name. (83h) of ID1 represents a composer name.

When the CD changer 6 has the custom file function, the memory portion 31 has a custom file memory (non-volatile memory). Character information (a disc name and a program name) that the user has input is stored in the custom file memory in such a manner that the character information correlates to the current CD and each program thereof in the one-to-one relation. In this case, the disc name is stored corresponding to the total performance time of the CD corresponding to the TOC information. In addition, each program name is stored corresponding to the performance time period thereof.

Next, TOC data recorded on a CD will be described. The TOC data is recorded with the Q channel of the subcode. The subcode has a data structure of which one frame is composed of 98 bits. 72 bits of the 98 bits are data. When POINT of the TOC data is in the range from 00 to 99, PMIN, PSEC, and PFRAME represent the start address (absolute time period) of each program. When POINT is A0, PMIN represents the program number of the first program of the current disc. In this case, PSEC and PFRAME are "00", each. When POINT is A1, PMIN represents the program number of the last program of the current disc. In this case, PSEC and PFRAME are "00", each. When POINT is A2, PMIN, PSEC, and PFRAME represent the start address of the lead-out area. Whenever a CD is loaded to the apparatus, such TOC data is read and stored in the TOC memory of the memory portion 31.

An interface 32 is connected to the controlling portion 27. An input/output terminal 33 is connected to the interface 32. A control signal is obtained from the input/output terminal 33. A control signal received through the control signal bus line is supplied from the terminal 33 to the controlling portion 32. The controlling portion 32 controls the reproducing operation of the CD changer 6. A signal that represents the status of the CD changer 6 and an identification signal can be output to the outside of the apparatus through the controlling portion 32.

The identification signal has information of CD text data, custom file data, a total performance time period, or a performance time period of each program. In addition, signals such as a clock signal and a reset signal necessary for sending data are input/output. As an example, data is serially and synchronously sent along with a clock signal.

In addition, the CD changer 6 has a displaying portion (that displays time information and character information), an operating portion, and so forth.

A magnetic head 43*a* and an optical block 43*b* of the MD recorder 7 records a digital audio signal to the magnetic optical disc (MD) 41 that is housed in a cartridge 40 and rotated by the spindle motor 42. In addition, the MD recorder 7 has a reproducing function for reproducing a program from the magnetic optical disc 41. However, in FIG. 2, the structure of the reproducing function of the MD recorder 7 is omitted.

An analog audio signal (normally, a stereo signal) is supplied from the output terminal 30 of the CD changer 6 to an input terminal 44. The audio signal is digitized by the A/D converter 45. The resultant digital audio signal is supplied to a signal processing circuit 46. The signal processing circuit 46 performs recording processes such as an ATRAC (Adaptive Transform Audio Coding) signal compressing process corresponding to modified DCT (Discrete Cosine Transform) method for compressing the digital audio signal, an error correction encoding process, a sector structure formatting process, and an EFM modulating process.

A record signal that is output from the signal processing circuit 46 is supplied to the magnetic head 43*a* through an amplifier 47. The magnetic head 43*a* and the optical block 43*b* record the digital audio signal to the magnetic optical disc 41. Wobbling grooves are embossed on the magnetic optical disc 41. Wobbling information of the wobbling grooves has clock information, servo information for the spindle motor 42, and address information. Data is recorded in the grooves. A signal reproduced from the wobbling grooves is supplied from the optical block 43*b* to the controlling portion 48. The controlling portion 48 extracts clock information, servo information, and address information from the reproduced signal. The optical block 43*b* reproduces data from the magnetic optical disc 41.

A servo circuit 49 is connected to the controlling portion 48. The servo circuit 49 drives the spindle motor 42. The servo circuit 49 performs the focus servo operation, the tracking servo operation, and the thread servo operation for the pickup composed of the magnetic head 43a and the optical block 43b.

When data is recorded to the magnetic optical disc 41, the record position of the data is designated corresponding to the address information in the wobbling information. The servo circuit 49 controls the positions of the magnetic head 43a and the optical block 43b so that data is recorded to the designated address corresponding to the signal received from the controlling portion 48. Data is recorded/reproduced as clusters to/from the MD.

A memory portion 50 is connected to the controlling portion 48. The memory portion 50 stores information such as characters to be recorded to the management area of the magnetic optical disc 41. In addition, the memory portion 50 stores information such as characters reproduced from the management area. The data format including the management area of the magnetic optical disc 41 will be described later.

Interfaces 51 and 52 are connected to the controlling portion 48. The interface 51 is connected to a control signal input/output terminal 53. A control signal bus line is disposed between the input/output terminal 53 and the control signal input/output terminal 33 of the CD changer 6. In addition, the interface 52 is connected to a control signal input/output terminal 54. The control signal input/output terminal 54 is connected to a control signal input/output terminal 61 of the personal computer 1 through a converter 10.

A control signal and an identification signal are sent and received between the controlling portion 48 of the MD recorder 7 and the personal computer 1 through the converter 10 and the interface 52. In addition, a control signal, an identification signal, and so forth are sent and received between the personal computer 1 and the controlling portion 27 of the CD changer 6 through the converter 10, the interface 52, the controlling portion 48 of the MD recorder 7, the interface 51, the input/output terminals 53 and 33, and the interface 32.

The personal computer 1 is composed of a CPU 62, a RAM 63, a ROM 64, a hard disk drive 65, an GUI 66, and an interface 67. The interface 67 is connected to a control signal input/output terminal 61 so as to send and receive a control signal, an identification signal, and so forth to/from the outside of the apparatus. The RAM 63 is a working memory. The ROM 64 is a memory that stores a program and so forth.

The GUI 66 has hardware and software. The hardware of the GUI 66 includes a display unit 3, a keyboard 4, and a mouse 5. The software of the GUI 66 includes a graphic function and an operating function. The graphic function allows windows and icons to be displayed on the display unit 3. The operating function allows the user to select and decide a window and/or an icon with the keyboard 4 and/or the mouse 5. In the system shown in FIG. 1, the personal computer 1 displays a window 11 that shows identification information of a plurality of programs that can be reproduced by the CD changer 6a. In addition, the personal computer 1 displays a window 12 that shows identification information of a plurality of programs that can be reproduced by the CD changer 6b. The user drags and drops identification information of a desired program to a window 13 with the mouse 5 so as to select a program to be recorded to the MD recorder 7. Likewise, in the system shown in FIG. 2, the personal computer 1 displays a window that shows identification information of programs that can be reproduced by the CD changer 6. The user drags and drops identification information of a desired program to another window so as to select a program to be recorded to the MD recorder 7.

Figure 3:
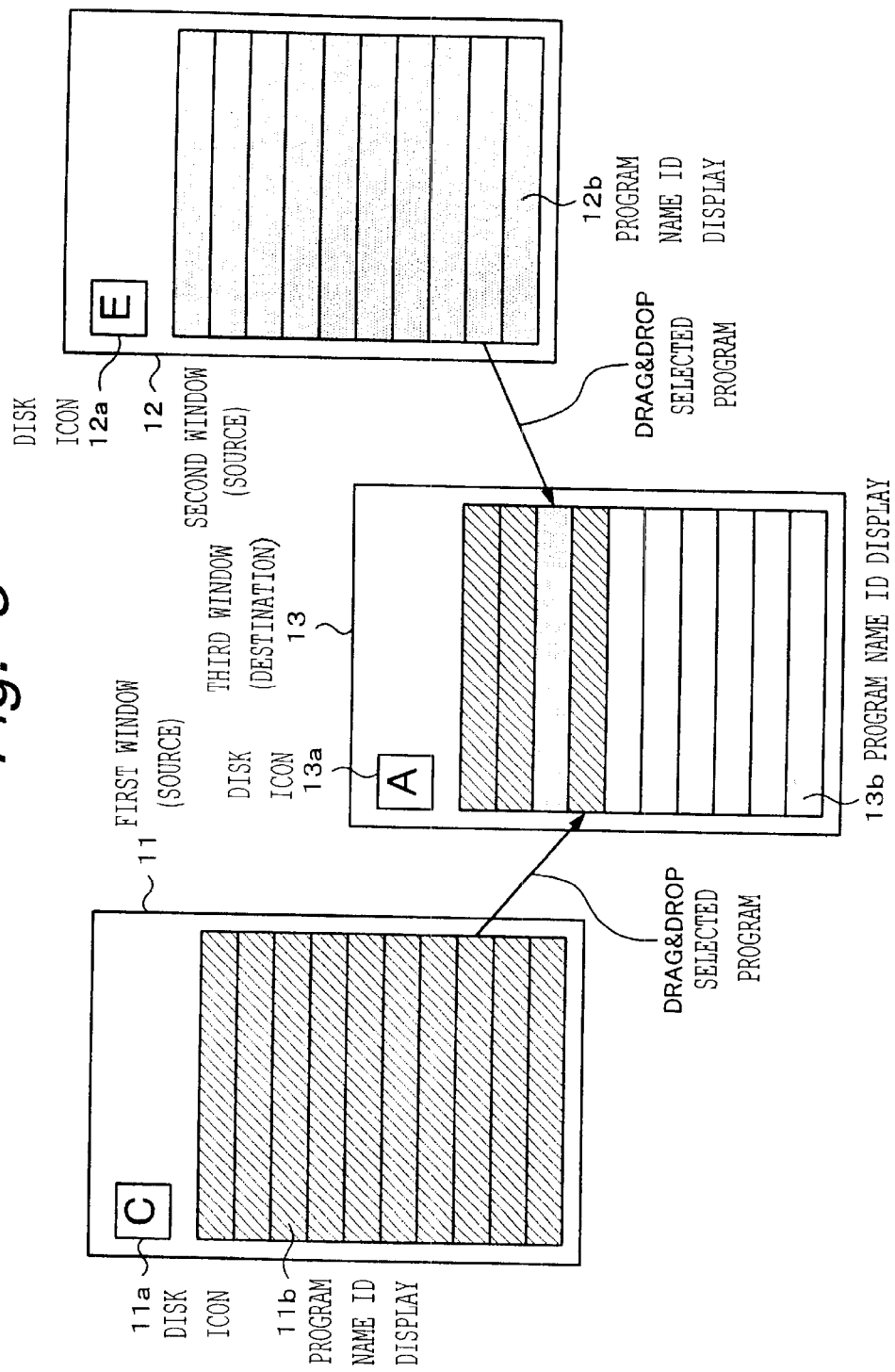
FIG. 3 is a schematic diagram for explaining a program selecting operation according to the embodiment of the present invention.

In the system shown in FIG. 1, the personal computer 1 displays windows 11, 12, and 13 as shown in FIG. 3 on the display unit 3. The window 11 has a disc icon 11a and a program name identification display portion 11b. The disc icon 11a identifies a CD from which the CD changer 6a reproduces a program. The disc icon 11a represents disc C). The program name identification display portion 11b lists identification information of a plurality of programs of the CD. Likewise, the window 12 has a disc icon 12a and program name identification display portion 12b. The disc icon 12a identifies disc E. Likewise, the window 13 has a disc icon 13a and program name identification display portion 13b. The disc icon 13a identifies disc A.

As shown in FIG. 3, when the user wants the MD recorder 7 to record the ninth program listed in the program name identification display portion 12b on the window 12 to an magnetic optical disc, he or she positions the cursor at the relevant identification information with the mouse 5 and drags and drops the identification information to the third position of the program name identification display portion 13b on the window 13 so as to select the program to be recorded to the magnetic optical disc. Likewise, when the user wants the MD recorder 7 to record the eighth program listed in the program name identification display portion 11b on the window 11 to the magnetic optical disc, he or she positions the cursor to the relevant identification information and then drags and drops the identification information to the fourth position in the program name identification display portion 13b on the window 13 so as to select the program to be recorded to the magnetic optical disc.

The user can select all programs of one CD instead of each program. In other words, when the user drags and drops the disc identification information (C) of the disc icon 11a to the disc icon 13a on the window 13, he or she can cause the MD recorder to record all the programs of the CD to the magnetic optical disc. Likewise, when the user wants the MD recorder 7 to record all programs of another disc on the window 12 to the relevant magnetic optical disc, he or she performs the similar operation.

Thus, the user can very easily select a CD and a program thereof to be recorded. In addition, since information of a source CD and information of a destination CD are displayed on respective windows, the user can easily and clearly know information necessary for the dubbing operation.

After the user has completed the CD/program selecting operation (for dubbing a program from a CD to an MD by the drag and drop operation), the personal computer 1 starts the dubbing operation. In other words, the personal computer 1 sends control signals to the CD changers 6a and 6b so that they reproduce programs from selected CDs in the selected program order. In addition, the personal computer 1 sends a control signal to the MD recorder 7 so that it records the programs reproduced by the CD changers 6a and 6b to an MD.

After the personal computer 1 has completed the dubbing operation, it sends a control signal and identification information to the MD recorder 7 through the control signal bus line so that disc identification information and program name identification information displayed on the window 13 are recorded to the management area of the MD.

The personal computer 1 automatically performs such a process after the selected programs have been recorded to the MD. Thus, the user can omit the input operation for a disc name and a program name to the MD. Alternatively, after the personal computer 1 has completed the dubbing operation, the personal computer 1 may prompt the user for identification information to be recorded.

In the above-described embodiment, the dubbing operation from a CD to an MD was described. When the dubbing operation is performed for a record medium such as an MD of which the program order can be changed, program name identification information of all programs recorded on the MD is be displayed as with the window 13 shown in FIG. 3. The order of the program name identification information is changed in the program name identification display portion 13 by the drag and drop operation. The changed result is sent from the personal computer 1 to the MD recorder 7. The MD recorder 7 rewrites information recorded in the management area of the MD with the changed result. Thus, only the management information is changed. In other words, it is not necessary to rewrite program data recorded on the MD. In the above-described dubbing operation, before a selected program is recorded to the MD, the user can change the order of program identification information in the program name identification display portion 13b on the window 13 by the drag and drop operation.

In addition, the present invention can be applied to only the reproducing operation rather than the recording operation. In this case, medium identification information and program name identification information of two or more reproducing apparatuses (a CD changer, a CD player, an MD recorder, and so forth) are displayed on two windows. As with the case shown in FIG. 3, the user selects desired programs in his or her desired order by the drag and drop operation. Thereafter, the relevant reproducing apparatuses are controlled so that they reproduce the selected programs in the selected order. Thus, desired programs can be easily reproduced from a plurality of mediums in a desired order. This operation is referred to as a programmed reproducing operation. In this case, when the personal computer 1 stores a selected result displayed on a window as a proper file, the user can use a plurality of files for the programed reproducing operation. Thus, the user can easily perform the programmed reproducing operation corresponding to a situation such as the time zone.

As described above, to cause the personal computer 1 to display disc identification information and program name identification information on windows, such information of the connected apparatuses is obtained and stored as a table or a database in the hard disk. FIG. 4 shows an example of the format of data stored in the personal computer 1.

In FIG. 4, category code is a code signal that represents the type of the current apparatus. The category code identifies a CD player, an MD recorder, or the like and the function thereof. The category code is sent from the controlling portion of each apparatus to the personal computer 1. In the case of a CD player and a CD changer, the category code represents a CD player, a CD text function (CD3), a custom file function (CD2), and a non CD text function (CD1).

CD number represents the medium number of a medium from which a program is recorded/reproduced to/from the current apparatus. In FIG. 4, each CD changer has a disc compartment that can hold up to five CDs. In this example, the CD number represents the disc position in the disc compartment. However, in FIG. 4, for simplicity, it is assumed that each CD changer reproduces programs of one CD at a time. Track number represents a track number of the current program on the current CD. The track number is a unique number starting with 000. Title, artist information, and time are recorded corresponding to each track number.

In the example shown in FIG. 4, data received from a CD changer with the custom file function (category code=CD2) is listed as the first entry. When the user inputs character information with the custom file function, information having a disc name and a program name shown in FIG. 4 is sent from the CD changer to the personal computer 1. The information is stored in the hard disk of the personal computer 1. In reality, in the first entry (track number=000), the disc name (ABC) of CD number 1 is stored. In the first entry, the total performance time period (53 minutes 20 seconds) of the disc is stored as time information. In the second entry (track number=001), the program name (XYZ) is stored. The performance time period (4 minutes 57 seconds) of the program is stored as time information. Likewise, up to track number 014, information of a program name and a performance time period is stored. In this case, the disc name is disc identification information, whereas the program name is program name identification information.

In FIG. 4, data received from a CD changer that has neither the custom file function, nor the CD text function is listed as a middle entry. In this case, the personal computer 1 receives only time information of the TOC from the CD changer and stores it in the hard disk. In reality, in an entry of (track number=000), the total performance time period (6 minutes 5 seconds) of CD number 6 is stored. In addition, information of the performance time period of each program of the CD is stored corresponding to each track number. In this case, the total performance time period is disc identification information, whereas the performance time period of each program is program name identification information.

In FIG. 4, data received from a CD changer having the CD text function (category code=CD3) is listed as a lower entry. In this case, the personal computer 1 receives a disc name, a program name, and artist information from the relevant CD changer. In reality, in an entry of (track number=000), the disc name (NMO) of CD number 2 is stored. As time information, the total performance time period (57 minutes 5 seconds) is stored. Corresponding to each track number, a program name (for example, FGH), an artist name (for example, cde), and time information (for example, 2 minutes 53 seconds) are stored. In this case, the disc name is disc identification information, whereas the program name is program name identification information. When a disc has one artist name, the artist information can be used as disc identification information. When programs of a disc have individual artist names, the artist information can be used as program name identification information. Data shown in FIG. 4 is preferably generated whenever each apparatus connected to the personal computer 1 reproduces a program from a medium such as a CD.

Figure 5:
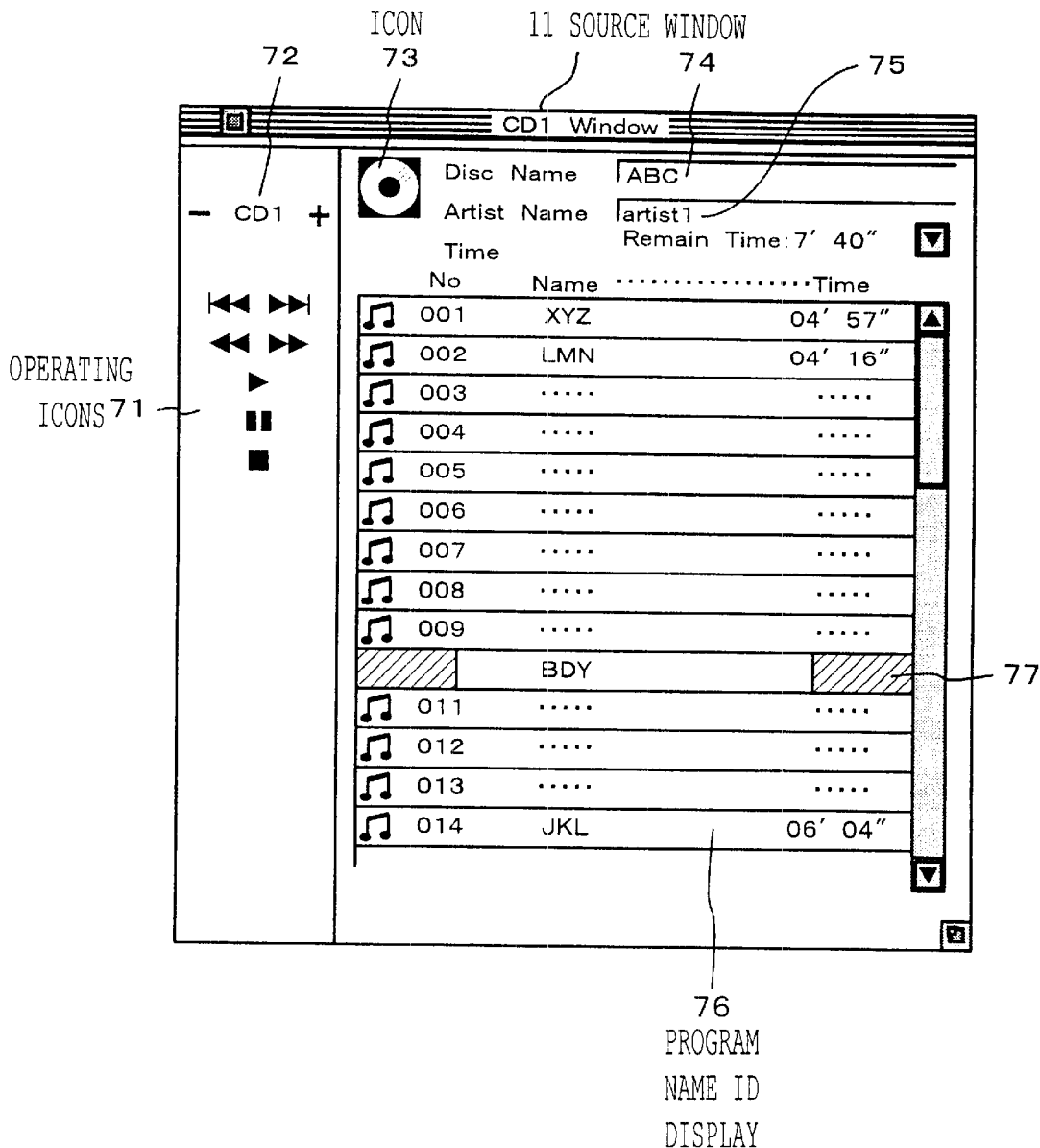
FIG. 5 is a schematic diagram showing a more practical example of a window according to the embodiment of the present invention.
Figure 6:
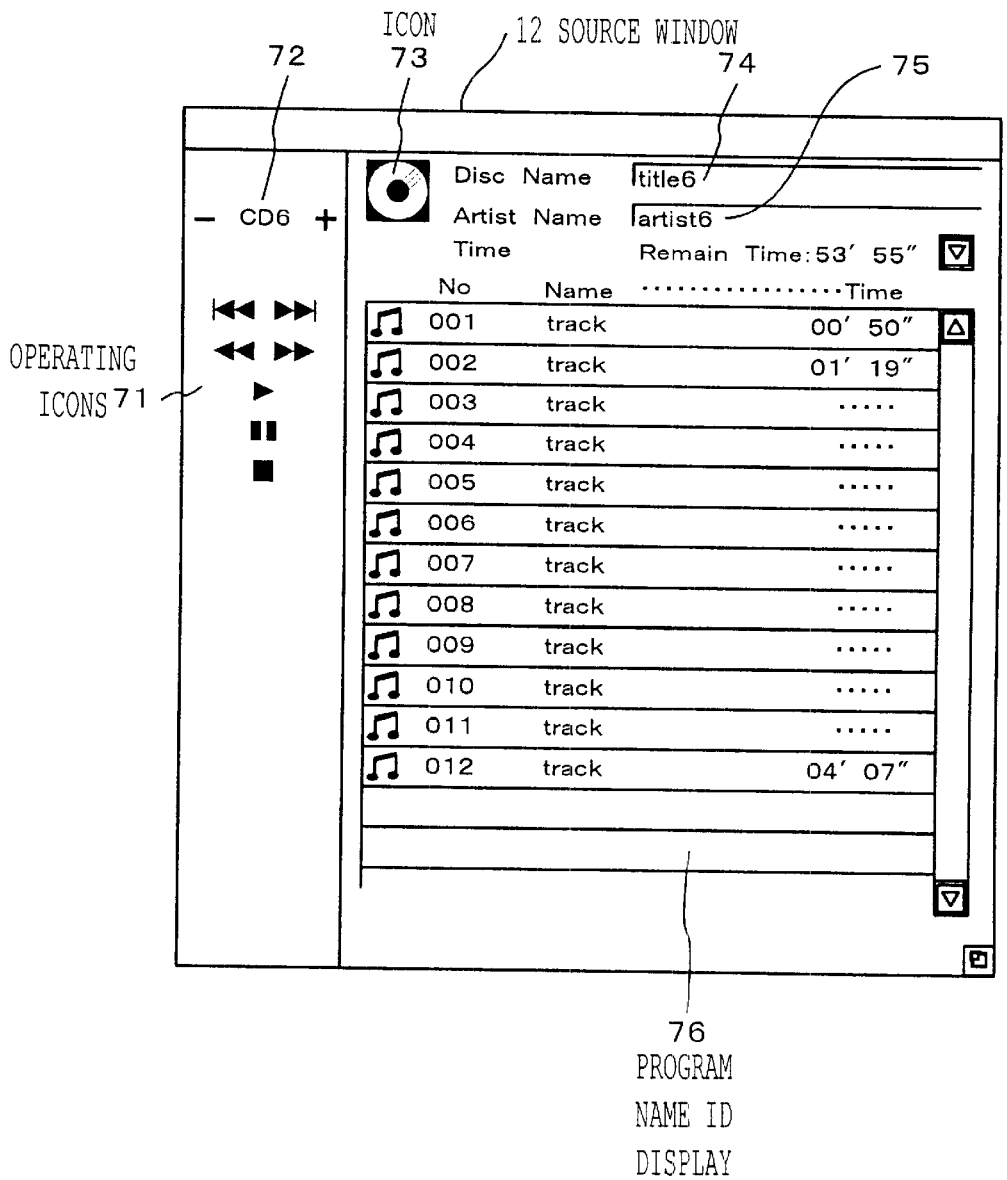
FIG. 6 is a schematic diagram showing a more practical example of a window according to the embodiment of the present invention.
Figure 7:
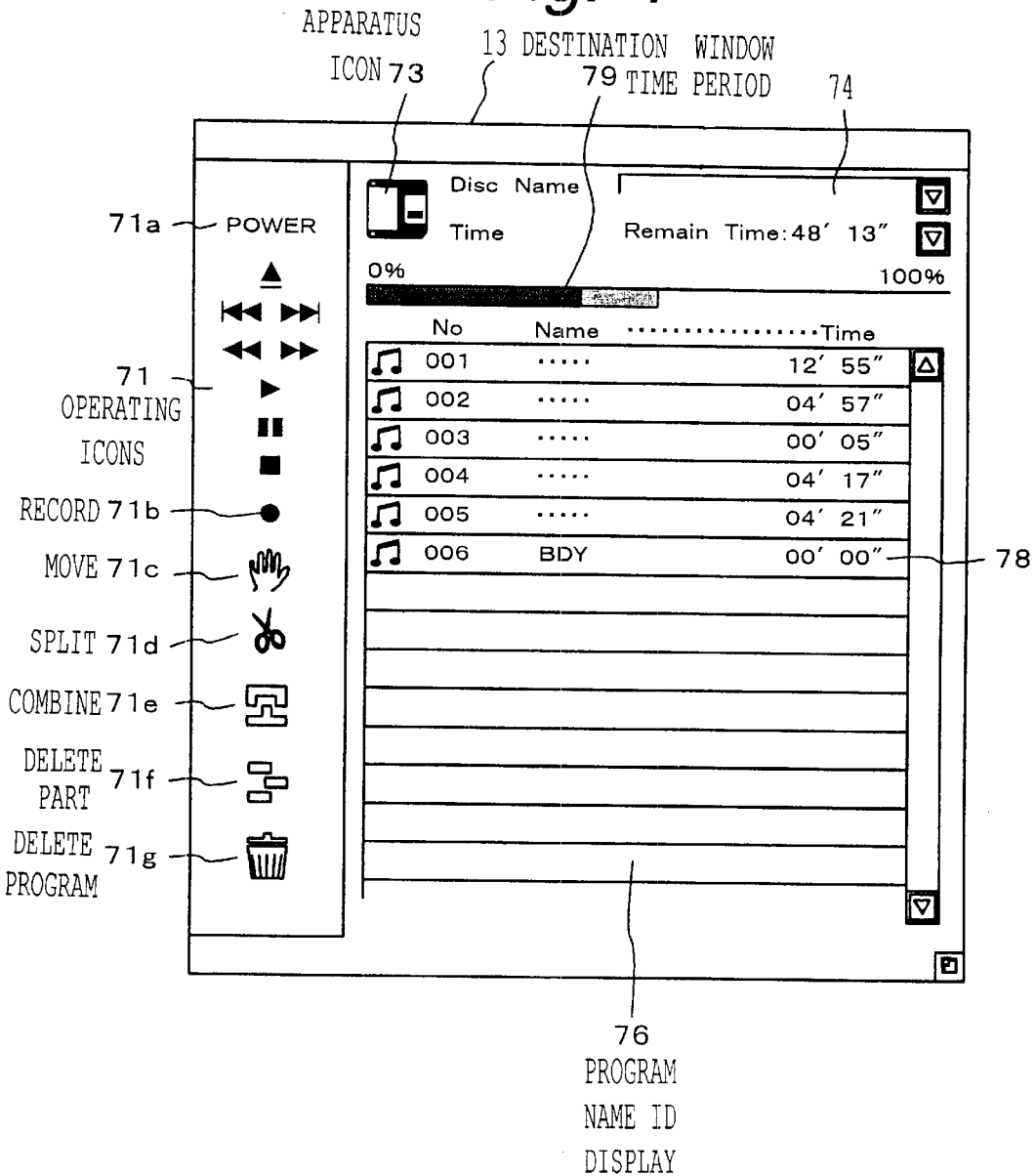
FIG. 7 is a schematic diagram showing a more practical example of a window according to the embodiment of the present invention.

Next, a more real example of windows shown in FIG. 3 will be described. FIG. 5 shows an example of the window 11. FIG. 6 is an example of the window 12. FIG. 7 is an example of the window 13. As with the case shown in FIG. 3, these windows are displayed on the display unit 3 of the personal computer 1 at a time.

When the CD changer 6a reproduces CD text information from a CD text format CD and the personal computer 1 stores the CD text information in the format shown in FIG.

4, the CD text information is displayed on the window shown in FIG. 5. The formats of the windows shown in FIGS. 5, 6, and 7 are similar to each other. A program name identification display portion 76 is displayed on the window shown in FIG. 5. On the left of the program name identification display portion 76, operation icons 71 corresponding to operation buttons of each apparatus are displayed. The operation icons 71 are a plurality of buttons similar to operation buttons of the CD player and the MD recorder.

On the window shown in FIG. 5, a CD number is displayed at an upper region of the operation icons. At an upper region of the program name identification display portion 76, an apparatus icon 73 (that represents the type of the apparatus), a disc name 74, and an artist name 75 are displayed. On the window shown in FIG. 5, the category code is data corresponding to CD3 shown in FIG. 4.

FIG. 6 shows an example of a window in the case that data (category code=CD1) of the TOC is received from the CD changer 6b. Since the CD changer 6b has neither the CD text function, nor the custom file function, performance time periods of individual programs are displayed.

The user drags and drops program name identification information displayed on the windows shown in FIGS. 5 and 6 to the window shown in FIG. 7. On the window shown in FIG. 7 (corresponding to the MD recorder 7), a power button 71a and a record button 71b are displayed as operation icons. At a lower region of the operation icons 71, a plurality of edit icons 71c to 71g for editing each program are displayed.

The icon 71c is used to move a program. With the icon 71c, the program order can be changed. The icon 71d is used to split a program. The icon 71e is used to combine two programs. The icon 71f is used to delete part of a program. The icon 71g is used to delete a program. With these edit icons, the user can edit a plurality of programs displayed on the window shown in FIG. 7.

Identification information (BDY) of a program with track number 010 on the window shown in FIG. 5 is dragged and dropped to the position of track number 006 on the window shown in FIG. 7. In this case, the display color of the position (line) corresponding to the selected program shown in FIG. 5 is changed or blinked. Thus, the user can easily know that the program of track number 010 has been selected.

On the window shown in FIG. 7, the selected program name is displayed at the position of track number 006. The performance time period of the selected program is 0 minute 0 second. In other words, this entry represents that although the program has been selected, it has not been recorded. In FIG. 7, a recordable time period display portion 79 is displayed at an upper region of the program name identification display portion. In the recordable time period display portion 79, assuming that the total record time period of the MD is 100%, the ratio of the performance time periods of the recorded programs to the total time period is represented by a bar. The bar has a fragmental portion with a different color or a different concentration. The fragmental portion represents an increase of the selected program in the bar. In other words, when a program is selected in the recordable time period display portion 79, the fragmental portion represents a decrease of the recordable time period of the MD.

When the user has completed the program selecting operation by the drag and drop operation of the GUI, the CD changer enters into the dubbing standby state for the program.

In other words, the CD changer sets the disc that has the program selected by the selecting operation to the reproducing block and enters into the reproduction standby state at the start position of the program.

In addition, the MD recorder that records the program references the U-TOC data of the MD and enters into the record standby state at the start position of the recordable area.

When the user clicks the record button 71b or the pause button of the operation icons 71, the CD changer reproduces the selected program and the MD recorder records the program. While the MD recorder is recording the program, the image of the record button 71b changes to for example a message "NOW REC" that represents that the dubbing operation is taking place. The selecting operation, the reproducing operation, and the recording operation may be performed for each program. Alternatively, after the selecting operation for a plurality of programs has been performed, the selected programs may be recorded to the relevant MD at a time.

After the selected program(s) or all the programs have been recorded, the disc identification information and the program name identification information displayed on the window are sent from the personal computer 1 to the MD recorder along with a control signal. The MD recorder records the disc identification information and the program name identification information to the management area of the MD. A message that represents that the text information is being recorded is preferably displayed on the window. Thus, after the user has performed the dubbing operation, he or she does not need to input text information to the MD. When a selected program does not have character information, the user can input the program name with the keyboard or the like of the personal computer 1 so as to record the program name to the MD. Likewise, the user can input the disc name with the personal computer 1.

The editing operation for a program recorded to a magnetic optical disc and the recording operation of character information thereto are performed for data in the management area of the magnetic optical disc.

Next, data of the management area of an MD as an optical magnetic disc will be described.

A U-TOC area for recording U-TOC data is formed on the inner periphery side of the recordable area of the MD. In the U-TOC area, information concerned with each program recorded in the program area is recorded.

A P-TOC (Pre-master Table Of Content) has been recorded as pre-pits in a lead-in area.

In the P-TOC, data such as the record position of the U-TOC area and the start position of a laser calibration area for calibrating laser power has been recorded.

To record/reproduce a program to/from the MD, management information (namely, the P-TOC and the U-TOC) that has been recorded on the MD should be pre-read.

In other words, the management information is read when the MD is loaded. The management information that has been read from the MD is stored in a predetermined storing means such as a DRAM. When a program is recorded or reproduced, the management information is referenced. When data is recorded or erased, the U-TOC is edited and rewritten. Whenever data is recorded/erased, the U-TOC stored in the predetermined storing means is edited. The edited U-TOC is written to the U-TOC area of the MD at predetermined timing.

The U-TOC is table-of-content information for managing each program recorded in the program area. The U-TOC area is composed of, for example, 32 sectors. Next, sectors 0, 1, 2, and 4 of the 32 sectors will be described. Sectors 3 and 5 to 32 are reserved for future expansions. Sector 0 is used to manage the start address and end address of each program, copy protect information, and emphasis information. FIG. 8 shows an example of the structure of sector 0. Each of sectors 0, 1, 2, and 3 is composed of 2352 bytes arranged as 588 four-byte slots. The 588 four-byte slots are identified slot 0 to slot 587. After the header portion, a cluster H, a cluster L, a maker code, a model code, a first TNO, a last TNO, a sector in-use state, a disc serial number, and a disc ID are successively recorded. The cluster H and the cluster L represent predetermined addresses. The maker code and the model code represent a manufacturer name and a model name of the disc, respectively. The first TNO and the last TNO represent the first and last program numbers, respectively.

In addition, a P-DFA (Pointer for Defective Area), a P-EMPTY (Pointer for EMPTY slot), a P-FRAM (Pointer for FReely Area), and a relevant table representation data portion are successively recorded. The P-DFA represents the start position of a slot for storing information concerned with the position of a defect that takes place on the MD. The P-EMPTY represents the in-use state of a slot. The P-FRA represents the start position of a slot for managing a recordable area. The relevant table representation data portion is composed of P-TNO1, P-TNO2, . . . , and P-TNO255 that represent the start positions of slots corresponding to the individual program numbers.

In slot 78 to slot 587, there are 255 slots. Each slot is composed of four bytes. Each slot is used to manage a start address, an end address, a track mode, and link information.

In the MD recording apparatus according to the present invention, data is not always sequentially recorded on the MD, which is a record medium. In other words, data dispersedly recorded on a record medium can be correctly reproduced. Next, a process for correctly connecting data that has been dispersedly recorded will be described. This process is performed with reference to the P-FRA in sector 0 of the U-TOC. FIGS. 9A to 9E show the case that 03h (where h represents hexadecimal notation) is recorded in the P-FRA. In this case, slot 03h is accessed as shown in FIG. 9A. A start address and an end address recorded in slot 03h represent a start address and an end address of one part recorded on the disc.

Link information recorded in slot 03h represents an address of a slot to be continued. In FIG. 9A, the address of the slot to be continued from slot 03h is 18h. Thus, slot 18h is accessed as shown in FIG. 9B. Since link information recorded in slot 18h is 1Fh (FIG. 9B), slot 1Fh is accessed (FIG. 9C).

Corresponding to link information of slot 1Fh, slot 2Bh is accessed (FIG. 9D). Corresponding to link information of slot 2Bh, slot E3h is accessed (FIG. 9E). Until link information of a slot to be continued becomes null (namely, 00h), link information is successively traced.

In such a manner, addresses of data that has been dispersedly recorded are successively obtained. The optical pickup is controlled so as to successively access such addresses on the MD. Thus, data that has been dispersedly recorded can be connected.

In the above-described process, data that has been dispersedly recorded is connected with reference to the P-FRA. Alternatively, data that has been dispersedly recorded can be connected with reference to the P-DFA, the P-EMPTY, or the P-TNO1, P-TNO2, . . . , and P-TNO255.

In sector 1 of the U-TOC area, titles of all programs and a disc title are managed. When programs recorded on the MD are audio data, the disc title is an album title, information concerned with a performer, and so forth. The titles of the individual programs are program names. FIG. 10 shows an example of the structure of sector 1 of the U-TOC area.

Character information of each program is recorded in a slot of the character table portion corresponding to the relevant table representation data P-TNAx (where x=1 to 255). When the number of characters is large, a plurality of slots are linked with link information. In sector 1 of the U-TOC area, available character codes have been defined so that titles are managed with alphabetic characters. However, when the user designates Katakana character input mode, a special code "^" is automatically generated. The alphabetic characters are surrounded by a pair of special codes "^" and managed in sector 1. The alphabetic characters surrounded with a pair of special codes "^" are converted into Katakana characters with a conversion table. With the conversion table, for example, "^a^" is converted into "ア" (Katakana character).

FIG. 11 shows an example of sector 2. Sector 2 is used to manage record date/time of each program recorded in the program area. FIG. 12 shows an example of sector 4. With character codes defined for sector 4, titles of individual programs recorded in the program area can be displayed in Kanji characters, Hiragana characters, and/or Katakana characters.

According to the present invention, an MD is used as a recordable medium. Alternatively, another record medium for example, a DVD (Digital Video Disc)-RAM, a CD-R, an MO, a magnetic tape, or a semiconductor memory may be used. Digital information recorded on the record medium is not limited to audio data. Thus, the digital information may be video data or the like. According to the present invention, the controlling apparatus is a personal computer. Alternatively, the controlling apparatus may be a dedicated controlling apparatus.

According to the present invention, the program selecting operation necessary for the dubbing operation can be effectively performed. In addition, since programs that can be dubbed and programs that have been selected can be displayed at a time, the user can easily know the status of the dubbing operation being performed. Thus, the user can effectively perform the dubbing operation.

When a record medium such as an MD of which the program record order can be changed is used, the program order can be changed by the drag and drop operation on windows. Thus, the user can easily perform the program changing operation.

When a plurality of programs are reproduced from a plurality of mediums in a designated order, data that represents programs to be reproduced and the program reproduction order can be easily created.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A controlling apparatus, connected to an audio and/or video reproducing apparatus and an audio and/or video recording apparatus through a bus line, for controlling a synchronous dubbing operation from the audio and/or video reproducing apparatus to the audio and/or video recording apparatus, the controlling apparatus comprising:

1) receiving means for receiving management information of a first record medium loaded in the audio and/or video reproducing apparatus and management information of a second record medium loaded in the audio and/or video recording apparatus, and for receiving from a category code generating means in said audio and/or video reproducing apparatus, a category code that specifies:
   a) a type of the first record medium; and
   b) a functional mode of the audio and/or video reproducing apparatus;
2) display data generating means for generating first display data corresponding to first management information received by said receiving means and generating second display data corresponding to second management information: and
3) controlling means for controlling the synchronous dubbing operation to the audio and/or video recording apparatus from the audio and/or video reproducing apparatus such that when a user shifts a cursor from a predetermined position in a first display area corresponding to the first display data generated by said display data generating means to another position in a second display area corresponding to the second display data, a program corresponding to said predetermined position in the first display area is reproduced by the audio and/or video reproducing apparatus and the reproduced program is recorded by the audio and/or video recording apparatus in accordance with said another position in the second display area.

2. The controlling apparatus as set forth in claim 1, wherein:
said display data generating means generates an element that represents a recordable capacity corresponding to the second management information and increases the length of the element by the length of a program recorded by the audio and/or video recording apparatus corresponding to the movement of the cursor from the first display area to the second display area.

3. The controlling apparatus as set forth in claim 1, wherein when the first display data designated by the cursor is moved from the first display area to the second display area, the second display area displayed in the second display area is edited corresponding to the first display data.

4. The controlling apparatus as set forth in claim 1, wherein the management information sent from the reproducing apparatus is a title name of each program, a performance time period of each program, and an album name.

5. The controlling apparatus as set forth in claim 1, wherein:
the category code specifies a current record medium type; and
the functional mode distinguishes a player function, a text function and a custom file function.

6. A dubbing system for dubbing a program from a first record medium to a second record medium, the system comprising:
A) an audio and/or video reproducing apparatus that is configured to hold said first record medium and that includes:
   A1) reproducing means for reproducing at least one of a program and a first management information from said first record medium on which a plurality of programs and management information are recorded;
   A2) category code generating means for generating a category code that specifies:
      a) a type of the first record medium; and
      b) a functional mode of the reproducing means;
B) an audio and/or video recording apparatus that is configured to hold the second record medium and that includes:
   B1) recording means for recording a program reproduced from said first record medium to said second record medium having a record area for recording a program and a management area for recording a second management information for managing the program recorded in the record area, and for receiving the category code generated by the category code generating means;
C) a controller via which said dubbing from said first record medium to said second record medium is performed, the controller including:
   C1) displaying means having a first display area for displaying the first management information which is read from said first record medium and a second display area for displaying the second management information which is read from the second record medium;
   C2) operating means for operating a cursor that designates a particular position of said displaying means;
   C3) controlling means for designating a program to be recorded from the first record medium to the second record medium when a user shifts the cursor from a predetermined position in the first display area to another position in the second display area; and
   C4) synchronous dubbing controlling means for controlling said recording means of said audio and/or video recording apparatus and said reproducing means of said audio and/or video reproducing apparatus to synchronously dub a program corresponding to said predetermined position in the first display area to said second record medium in accordance with said another position in the second display area.

7. The dubbing system as set forth in claim 6, wherein the second display area of said displaying means has an element that represents a recordable capacity, and
wherein after desired management information is designated in the first display area of said displaying means and then moved to the second display area of said displaying means by said operating means, the element is increased for the length of the program corresponding to the desired management information.

8. The dubbing system as set forth in claim 6, wherein after desired management information is designated in the first display area of said displaying means and then moved to the second display area of said displaying means by said operating means, management information displayed in the second display area is edited corresponding to the management information designated in the first display area.

9. The dubbing system as set forth in claim 8, wherein the edited management information displayed in the second display area is recorded to the management area of the second record medium.

10. The dubbing system as set forth in claim 6, wherein the management information displayed in the first display area is a title name of each program, a performance time period of each program, and an album name.

11. The dubbing system as set forth in claim 1, wherein:

the category code specifies a current record medium type; and the functional mode distinguishes a player function, a text function and a custom file function.

12. A controlling method for a dubbing operation performed by:

A) an audio and/or video reproducing apparatus for reproducing at least one of a program and a first management information from a first record medium on which a plurality of programs and first management information for managing the programs are recorded, said audio and/or video reproducing means including category code generating means for generating a category code that specifies:

a) a type of the first record medium; and b) a functional mode of the audio and/or video reproducing apparatus;

B) an audio and/or video recording apparatus for recording a program reproduced from said first record medium to a second record medium having a record area for recording a program and a second management area for recording a second management information for managing the program recorded in the record area and for receiving the category code generated by the category code generating means, and C) a controlling apparatus for controlling the audio and/or video reproducing apparatus and the audio and/or video recording apparatus, wherein:

the audio and/or video reproducing apparatus, the audio and/or video recording apparatus and the controlling apparatus are connected with a bus line, a program is sent from the audio and/or video reproducing apparatus to the audio and/or video recording apparatus so as to perform the dubbing operation, and the controlling method comprises:

1) displaying a first contents list corresponding to the first management information received from the audio and/or video reproducing apparatus and a second contents list corresponding to the second management information received from the audio and/or video recording apparatus;

2) designating a desired program on the first contents list with a cursor and moving the cursor to the second content list so as to designate a program to be recorded from the first record medium to the second record medium; and 3) controlling the dubbing operation to the audio and/or video recording apparatus from the audio and/or video reproducing apparatus so that the desired program designated by the cursor on the first contents list is reproduced from the first record medium and so that the reproduced program is recorded to the second record medium.

13. The controlling method as set forth in claim 12, further comprising the steps of:

calculating the recorded capacity of the second record medium corresponding to the second management information;

displaying the calculated recorded capacity; and increasing an indication of the calculated recorded capacity by the capacity of a predetermined program that is designated on the first contents list and moved to the second content list by the cursor.

14. The controlling method as set forth in claim 12, further comprising the steps of:

editing the second contents list and displaying the edited second contents list after a predetermined program displayed on the first contents list is designated and moved to the second contents list by the cursor.

15. The controlling method as set forth in claim 12, wherein the edited second contents list is recorded to the management area of the second record medium.

16. The controlling method as set forth in claim 12, wherein the first management information is a title name of each program, a performance time period of each program, and an album name.

17. The controlling method as set forth in claim 12, wherein:

the category code specifies a current record medium type; and the functional mode distinguishes a player function, a text function and a custom file function.

* * * * *

UNITED STATES PATENT AND TRADEMARK OFFICE
CERTIFICATE OF CORRECTION

PATENT NO.    : 6,462,753 B1                                   Page 1 of 1
DATED         : October 8, 2002
INVENTOR(S)   : Tomohiro Koyata et al.

It is certified that error appears in the above-identified patent and that said Letters Patent is hereby corrected as shown below:

Column 5,
Line 4, change "different of formats" to -- different formats --;

Column 10,
Line 23, change "an" to -- a --;

Column 11,
Line 15, chagne "is be" to -- is to be --.

Signed and Sealed this

Twenty-second Day of April, 2003

JAMES E. ROGAN
*Director of the United States Patent and Trademark Office*